(12) United States Patent
Looby

(10) Patent No.: US 11,593,421 B2
(45) Date of Patent: Feb. 28, 2023

(54) RECREATING ELECTRONIC CONTENT

(71) Applicant: International Business Machines Corporation, Armonk, NY (US)

(72) Inventor: Bill Looby, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 296 days.

(21) Appl. No.: 16/654,250

(22) Filed: Oct. 16, 2019

(65) Prior Publication Data

US 2021/0117461 A1 Apr. 22, 2021

(51) Int. Cl.
| G06F 16/00 | (2019.01) |
| G06F 16/383 | (2019.01) |
| G06F 11/14 | (2006.01) |
| G06F 16/33 | (2019.01) |

(52) U.S. Cl.
CPC ........ *G06F 16/383* (2019.01); *G06F 11/1451* (2013.01); *G06F 11/1469* (2013.01); *G06F 16/3331* (2019.01)

(58) Field of Classification Search
CPC ............... G06F 16/383; G06F 16/3331; G06F 11/1451; G06F 11/1469
USPC .......................................................... 707/634
See application file for complete search history.

(56) References Cited

U.S. PATENT DOCUMENTS

| 6,453,325 B1* | 9/2002 | Cabrera | ............... G06F 11/1461 |
| 8,805,789 B2* | 8/2014 | Berman | ............... G06F 11/1469 |
| | | | 707/649 |
| 9,158,927 B1 | 10/2015 | Franklin et al. | |
| 2006/0150178 A1* | 7/2006 | Jerrard-Dunne | .......... G06F 8/71 |
| | | | 717/168 |
| 2007/0037574 A1* | 2/2007 | Libov | ............... H04M 3/42357 |
| | | | 455/435.2 |
| 2010/0274769 A1* | 10/2010 | Hazlewood | ............. G06F 16/10 |
| | | | 707/E17.005 |
| 2012/0109997 A1* | 5/2012 | Sparks | .................. G06F 16/435 |
| | | | 707/769 |
| 2012/0124306 A1 | 5/2012 | Abercrombie et al. | |
| 2015/0120675 A1 | 4/2015 | Mason, Jr. et al. | |
| 2015/0339370 A1 | 11/2015 | Onusko et al. | |
| 2016/0092549 A1* | 3/2016 | Byron | ..................... G06F 40/30 |
| | | | 707/739 |

OTHER PUBLICATIONS

Wikipedia, *Backup Software*, Sep. 18, 2019, 3 pages, wikipedia.org (online), <https://en.wikipedia.org/wiki/Backup_ software>.
Microsoft, *How to recover a lost Word document*, Office Products Troubleshooting, Sep. 16, 2019, 4 pages, microsoft.com (online), <https://support.microsoft.com/en-gb/help/316951/how-to-recover-a-lost-word-document>.

* cited by examiner

*Primary Examiner* — Monica M Pyo
(74) *Attorney, Agent, or Firm* — Teddi Maranzano

(57) ABSTRACT

Concepts for recreating electronic content are presented. One example comprises identifying one or more content references in one or more content sources, wherein each of the one or more content references is associated with a content item. The method then comprises, for each of the one or more identified content references, retrieving the associated content item, then normalizing the one or more retrieved content items to obtain one or more normalized content items. The method then comprises recreating electronic content by combining the one or more normalized content items.

17 Claims, 5 Drawing Sheets

RECREATING ELECTRONIC CONTENT

BACKGROUND

Field of the Disclosure

The present disclosure relates generally to electronic content, and more particularly to recreating electronic content.

Description of Related Art

Many traditional computer systems include features that enable content backup and restore. A content backup is the process of duplicating content (i.e. information or data) to allow retrieval of the duplicate content after a content loss event, and enables mitigating the risk of permanently losing the content. Traditional content backup services ensure that electronic content (e.g. electronic information or data) is secure and that critical information is not lost in an emergency (e.g. a natural disaster, a theft situation, etc.). A content restore is the process of copying backup content from secondary storage and restoring it to its original location or a new location. A content restore is performed to return content that has been lost, stolen, or damaged to its original condition or to move the content to a new location.

Typically, a content backup and restore is primarily employed in order to recover content after its loss from content deletion or corruption, and secondarily to recover content from an earlier time, based on a user-defined content retention policy.

Traditional content backup and restore services have certain limitations. Data storage requirements and financial costs attached to such services are typically relatively high, resulting in a lack of accessibility for individual users to employ such services. Instead, content backup and restore services employed by systems are typically used for large-scale emergencies covering multiple users, such as disaster recovery. Additionally, traditional content backup and restore services typically suffer from timeline limitations, where content is only backed up for a predefined period of time in order to improve the efficiency of data storage use. Once a content backup reaches its corresponding date of expiration, the content is deleted and consequently permanently lost.

Another limitation of traditional content backup and restore services relates to user-access rights for content. Typically, content restoration services are user-based and employ an access control list (ACL), which provides information to a computer operating system relating to access rights for each user to particular content (e.g. a file directory or an individual file). For example, an issue arises when a user only has read-access to certain content, preventing the user from recovering the content if required.

SUMMARY

The present disclosure seeks to provide a computer-implemented method for recreating electronic content.

The present disclosure further seeks to provide a computer program product including computer program code for implementing a proposed method when executed by a processing unit.

The present disclosure also seeks to provide a processing system adapted to execute this computer program code.

The present disclosure also seeks to provide a system for recreating electronic content.

According to an aspect of the present disclosure, there is provided a computer-implemented method. The method comprises identifying one or more content references in one or more content sources, wherein each of the one or more content references is associated with a content item. The method then comprises, for each of the one or more identified content references, retrieving the associated content item, then normalizing the one or more retrieved content items to obtain one or more normalized content items. The method then comprises recreating electronic content by combining the one or more normalized content items.

According to yet another aspect of the disclosure, there is provided a system for recreating electronic content. The system comprises a reference-identifying unit configured to identify one or more content references in one or more content sources, wherein each of the one or more content references is associated with a content item. The system further comprises a retrieving unit configured to, for each of the one or more identified content references, retrieve the associated content item. The system further comprises a normalizing unit configured to normalize the one or more retrieved content items to obtain one or more normalized content items and a recreating unit configured to recreate electronic content by combining the one or more normalized content items.

According to another aspect of the disclosure, there is provided a computer program product for recreating electronic content. The computer program product comprises a computer readable storage medium having program instructions embodied therewith, the program instructions executable by a processing unit to cause the processing unit to perform a method according to a proposed embodiment.

According to another aspect of the disclosure, there is provided a processing system comprising at least one processor and the computer program product according to an embodiment. The at least one processor is adapted to execute the computer program code of said computer program product.

BRIEF DESCRIPTION OF THE DRAWINGS

Embodiments of the present disclosure will now be described, by way of example only, with reference to the following drawings, in which.

DETAILED DESCRIPTION

Figure 1:
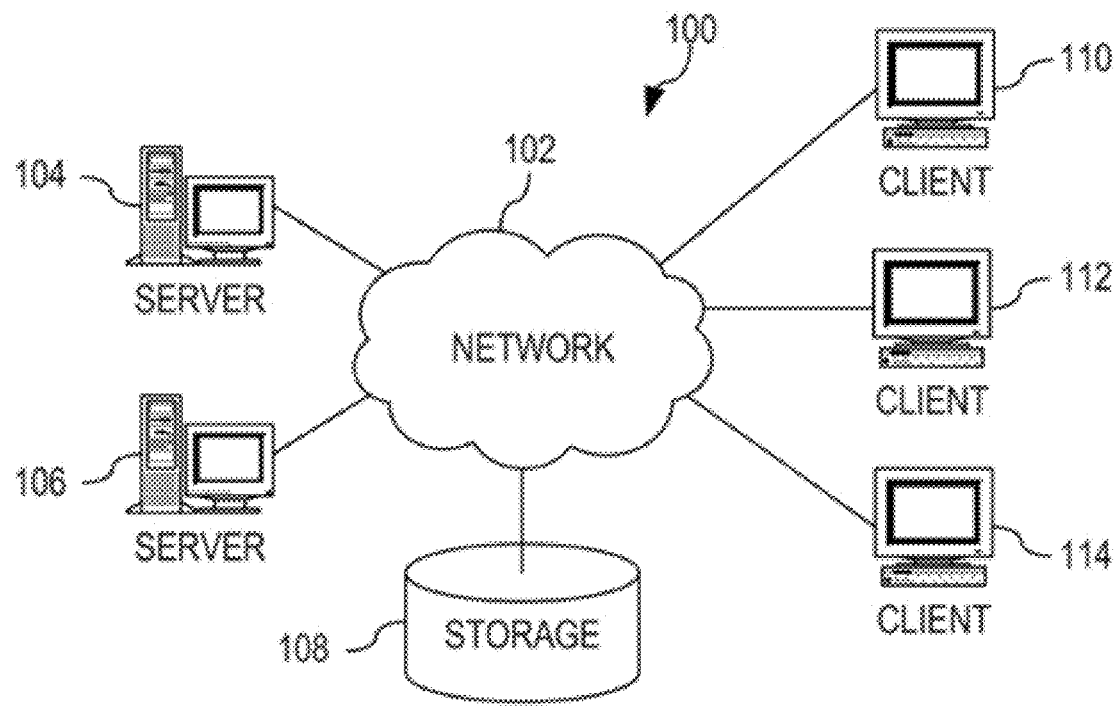
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Concepts for recreating electronic content are proposed. Such concepts may involve a concept of normalizing one or more content items from one or more content sources, such that the one or more normalized content items may be integrated to recreate lost electronic content. Embodiments may thus employ a process of (re)structuring content items in accordance with 'normal forms' (e.g. first, second and third normal forms) in order to reduce data redundancy and improve data integrity. For instance, data and/or values of content items that are represented in different formats and/or measured on different scales are adjusted to a notionally common format or scale. This may involve rescaling, translating and/or converting of data and/or values for example. For example, normalizing content items that include numerical values in the form of fractions may comprise rescaling the fractions to a predetermined numerical scale (e.g. converting all fractions to percentages). In another example, normalizing content items that include numerical values in the form of currency may comprise converting the numerical values to a common currency (e.g. converting all currencies to Euros, €, EUR). In yet another example, normalizing content items that include numerical values with associated units of measurement may comprise converting the units to a common system of units (e.g. International System of Units (SI Units) or Imperial Units). In yet another example, normalizing content items that include date values may comprise converting the date values to a standard date format (e.g. DD/MM/YYYY or DD MONTH YYYY). In yet another example, normalizing content items that include electronic files may comprise converting the electronic files to a predetermined file format (e.g. converting all image files to a Joint Photographic Experts Group (JPEG) format). In yet another example, normalizing content items that include text may comprise translating the text to a common language (e.g. translating text from all of the content items to English). Further examples of normalizing content items are provided in the description below. Normalization of data is a widely-known and well-studied field, especially in relation to databases, and so proposed embodiments may leverage a wide range of existing data normalization concepts and/or algorithms in order to normalize content items.

A content source may refer to a notification system, a social notification system, or a source of information from a notification system. Examples of such content sources may include, but may not be limited to: a social media application activity feed; a team collaboration/communication application; a dialogue or message list of a communication application; an activity log of project working application; an electronic communication application. More generic examples may include: email notifications for modified source; automatically generated social media posts; news (e.g. Rich Site Summary, RSS) feeds (including propagation and download of these feeds). A content item may refer to a piece of information with contextual meaning, such as textual, video, audio, or graphical information. Accordingly, embodiments may facilitate normalizing the one or more content items retrieved from one or more content references associated with each of the one or more content items.

A content reference may refer to an indicator or a summary of a content item in a content source. A content reference may not provide all information relating to a content item, and instead may only provide an indication relating to the content item. By way of example, an indication may comprise a limited set of characters and/or an image of a restricted size and/or resolution. Specific examples of content references may include: a link provided in a social media post that will automatically retrieve a summary for display; and update notifications (e.g. via email or text message) that will typically contain information about the update or a summary of a complete entry. The one or more content references may be identified from one or more content sources.

Embodiments may be implemented in conjunction with modern notification mechanisms found in notification systems. These mechanisms provide a large amount of summary content (i.e. content references) from the notification systems (i.e. content sources). The summary content can be used to recreate at least a summary version of the original content at a relatively low cost, and enables focus on individual user requirements when recreating the original content. Additionally, notification systems typically reference associated (i.e. secondary) content, such as associated comment streams. In other words, notification systems provide content references to secondary content items that are separate to primary content items, but are indirectly related to the primary content items. These secondary content items can also be recovered (i.e. recreated).

Proposed embodiments may employ a concept of recreating lost electronic content from one or more content items found in social notification systems that reflects the history of the electronic content. This is achieved by recreating the electronic content using one or more content events associated with the one or more content items. The one or more content events refer to past events that the associated one or more content items has incurred, such as an action performed on the one or more content items. As a result, the one or more content events provide historical information relating to the associated one or more content items.

The inventors propose the provision of a recreating unit. Such a recreating unit may be configured to recreate or reconstruct electronic content by combining one or more normalized content items. Electronic content may refer to information in electronic form. Examples of electronic content include, but are not limited to, documents, records, emails, and electronic communications, videos, and audio files.

Embodiments may thus facilitate electronic content restoration from social notifications. Recreated electronic content can be restored to an original source or system due to time or cost constraints with alternative restoration mechanisms. Conversely, recreated electronic content can be restored to an external source in order to avoid access restrictions.

In a proposed embodiment, identifying the one or more content references in the one or more content sources may comprise identifying one or more reference properties, then identifying the one or more content references based on the one or more identified reference properties. In this way, the one or more content references may be identified in the one or more content sources based on properties relating to the one or more content references. This may improve the accuracy and reliability in identifying content references, as the risk of falsely identifying a content reference or failing to identify a content reference may be mitigated.

In some embodiments, the one or more reference properties associated with each of the one or more content references may comprise at least one of a content generator, a content identifier, a content network address, and a container identifier. In this way, information relating to attributes of the one or more content references may be used to identify the one or more content references. A content network address and a container identifier may enable the provision of information relating to the location of the one or more content items associated with the one or more content references, which may enable the electronic content to be recreated in the original source of the electronic content.

In a proposed embodiment, normalizing the one or more retrieved content items may comprise identifying one or more content fields, wherein each of the one or more content fields comprises a predefined field format. The step may then comprise organizing content information from each of the one or more retrieved content items using the one or more identified content fields. The step may then comprise, based on the one or more predefined field formats, adjusting one or more formats of the organized content information from each of the one or more retrieved content items. In this way, one or more retrieved content items from one or more content sources may be normalized using the predefined field formats. This enables the content from one or more separate content sources to be integrated efficiently and effectively. As a result, electronic content may be recreated from multiple content sources, which may enable the accuracy of the recreated electronic content to be improved.

In some embodiments, the one or more content fields may comprise at least one of a content identifier, a content title, a content summary, a content owner, a content action, a content actor, a content action date, and a container identifier. In this way, the one or more retrieved content items may be organized based on attributes of the one or more retrieved content items. This improves the efficiency of normalizing the one or more retrieved content items, as each of the one or more content fields has an associated predefined field format that may be specifically tailored to the corresponding content field.

In a proposed embodiment, combining the one or more normalized content items may comprise identifying one or more content events associated with each of the one or more normalized content items, wherein the one or more content events are from the one or more content sources. The step may then comprise identifying a timestamp associated with each of the one or more identified content events and, for each of the one or more normalized content items, arranging the one or more identified content events based on the identified timestamp associated with each of the one or more identified content events. The step may then comprise determining an information consistency of each of the one or more normalized content items by assessing the one or more arranged content events and selecting one or more content items from the one or more normalized content items based on the determined information consistency of each of the one or more normalized content items. The step may then comprise combining the one or more selected content items.

In this way, the one or more content events associated with each of the one or more normalized content items may be ordered and assessed chronologically. This may enable discrepancies (i.e. information changes) to be detected between each of the one or more content events. As such, an information consistency of the one or more content events associated with each of the normalized content items may be determined, which may result in determining information consistency of each of the one or more normalized content items. This may improve the reliability in selecting the one or more content items for combining the one or more selected content items, as the most updated versions of the one or more content items may be selected. Consequently, the accuracy and reliability of recreating electronic content from multiple content sources is improved. Additionally, assessing the one or more arranged content events, wherein the one or more arranged content events may be arranged based on the identified timestamp associated with each of the one or more identified content events may enable the recreated electronic content to reflect the history of the electronic content.

In some embodiments, combining the one or more normalized content items may further comprise identifying a measure of information richness associated with each of the one or more normalized content items, such that selecting one or more content items from the one or more normalized content items is further based on the identified measure of information richness associated with each of the one or more normalized content items. Information richness may refer to an amount of detail contained in a piece of information, such as textual, graphic, audio, or video information. Put another way, information richness may be thought of as the ability of information to change understanding within a time interval. The more learning that can be provided by information, the richer the information. Information Richness Theory is a known and widely-studied field, and so further detailed explanation is hereby omitted. However, purely by way of example, in an embodiment, the measure of information richness may be identified by comparing each of the one or more normalized content items to identify a measure of an information markup between each of the one or more normalized content items, e.g. by using a machine-learning algorithm. Many other ways of measuring information richness are known from the field of Information Richness Theory and may be employed by proposed embodiments. In this way, one or more content items may be selected based on both the information consistency and the information richness associated with each of the one or more normalized content items. This may enable the electronic content to be recreated using the richest content items (i.e. the content items with the greatest associated information richness), which may consequently improve the reliability in recreating the electronic content, as more information associated with the electronic content may be recreated.

In some embodiments, combining the one or more normalized content items may further comprise determining the information richness associated with each of the one or more normalized content items by assessing the one or more arranged content events. In this way, the measure of the information richness associated with each of the one or more normalized content items may be identified.

In some embodiments, recreating the electronic content may comprise recreating the electronic content using one of an original source associated with the content and an external source. In this way, the destination of the recreated electronic content may be chosen based on the user's preference, improving the versatility of recreating the electronic content and enabling the user to avoid access restrictions.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
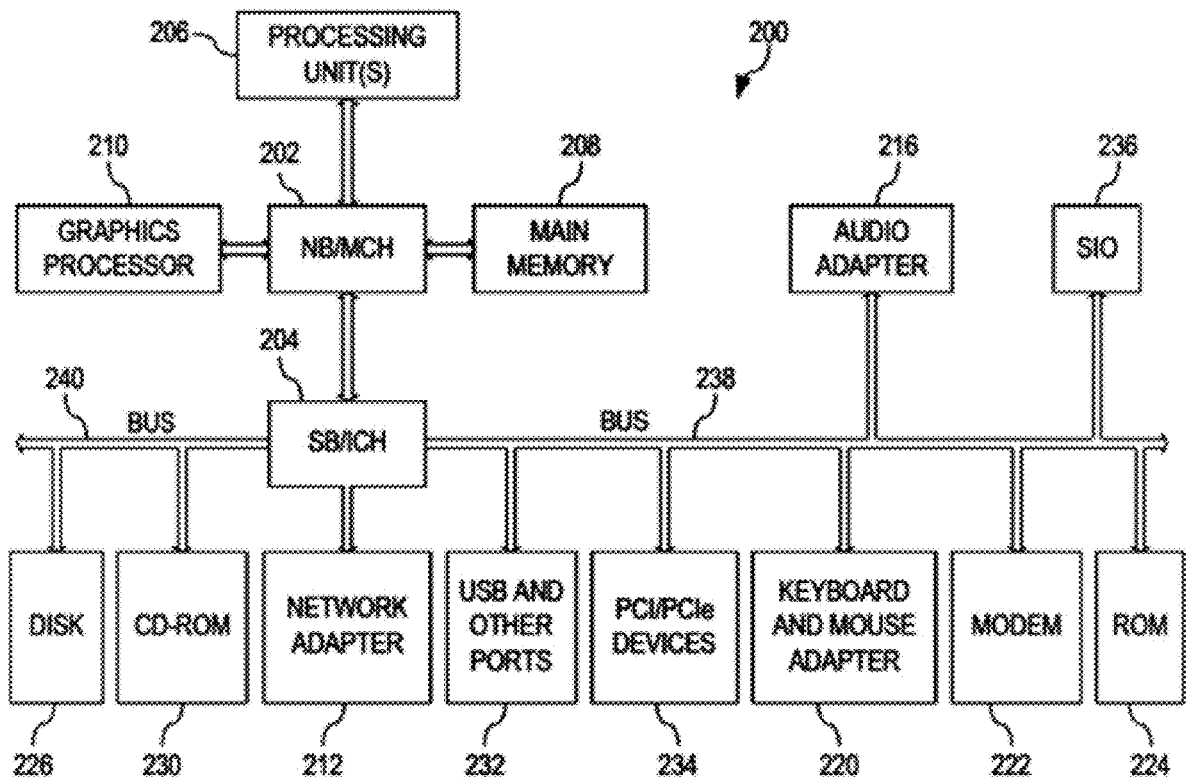
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located. For instance, the system 200 may be configured to implement a normalizing unit and a recreating unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer and AIX are trademarks of International Business Machines Corporation in the United States and/or other countries. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
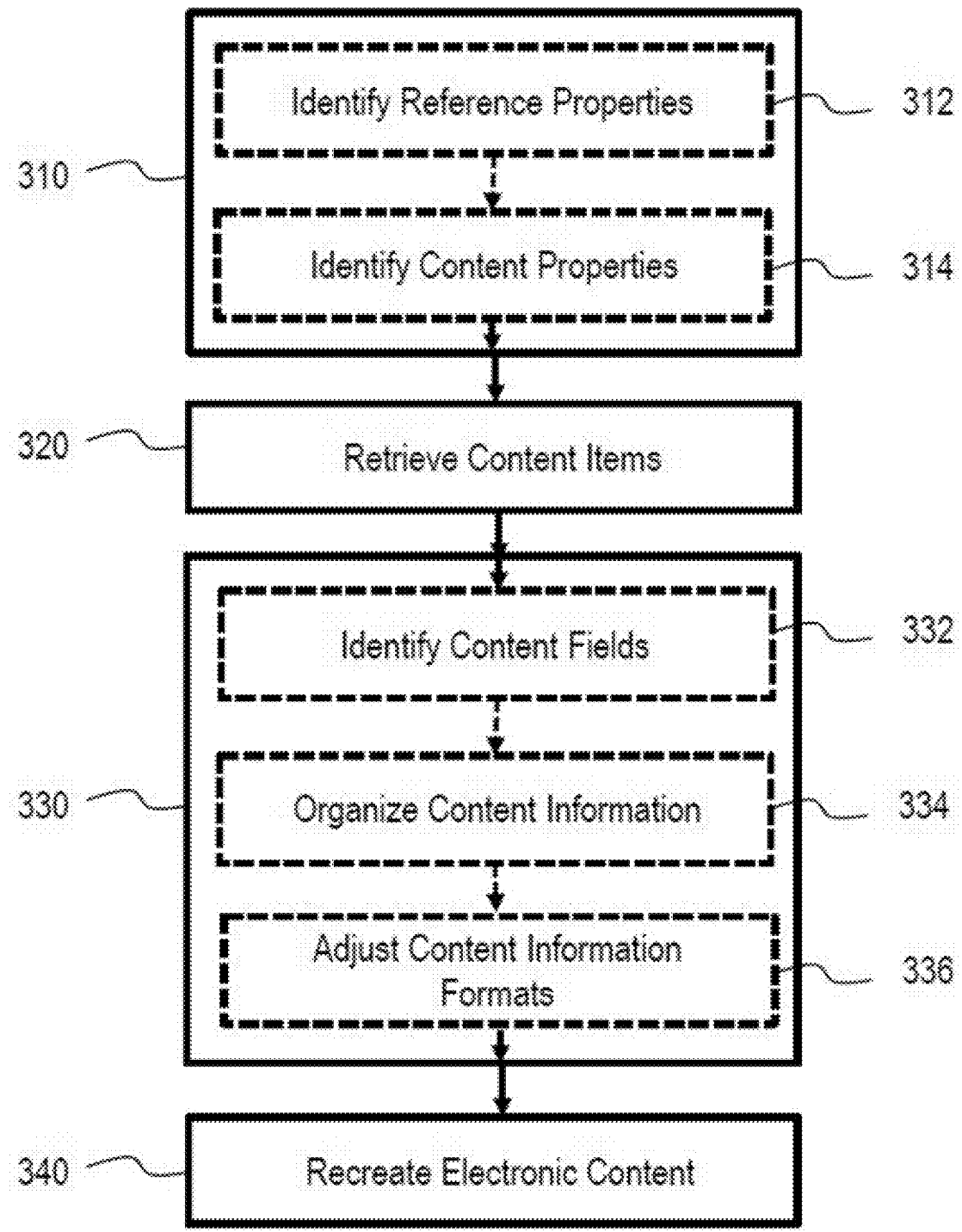
FIG. 3 is a flow diagram of a computer-implemented method for recreating electronic content.

Referring now to FIG. 3, there is depicted a flow diagram of a computer-implemented method for recreating electronic content.

Step 310 comprises identifying one or more content references in one or more content sources, wherein each of the one or more content references is associated with a content item. For example, the one or more content sources can be one or more implementers of appropriate notification systems, such as implementers of Activity Streams based application program interfaces (APIs). Each of the one or more content references is identified from the one or more implementers of appropriate notification systems. In an example, the one or more content sources can also be one or more notification systems.

In an embodiment, identifying the one or more content references in the one or more content sources comprises steps 312 and 314. Step 312 comprises identifying one or more reference properties. Step 314 comprises identifying the one or more content references based on the one or more identified reference properties.

In an embodiment, the one or more reference properties associated with each of the one or more content references comprises at least one of a content generator, a content identifier, a content network address, and a container identifier. Examples of the reference properties include, but are not limited to, the content generator being a software application, the content identifier being an ID of content, the content network address being a Uniform Resource Locator (URL) associated with content, and the container identifier being an Identifier (ID) of a container. In an example, a combination of the content generator, content identifier, and/or the content network address can be used to uniquely identify content references in notification systems. As a result, if the notification system does not support query of the one or more content references using these reference properties, then the content references are stored in a separate database that enables querying of the one or more content references. The one or more content references are then queried in the separate database and returned as appropriate. In an example, if a container identifier is specified, then all content identifiers associated with the container of the container identifier are retrieved. The processing of each of the one or more content references associated with the container identifiers is completed individually.

Step 320 comprises, for each of the one or more identified content references, retrieving the associated content item.

Step 330 comprises normalizing the one or more retrieved content items to obtain one or more normalized content items.

In an embodiment, normalizing the one or more retrieved content items comprises steps 332, 334, and 336. Step 332 comprises identifying one or more content fields, wherein each of the one or more content fields comprises a predefined field format. Step 334 comprises organizing content information from each of the one or more retrieved content items using the one or more identified content fields. Step 336 comprises, based on the one or more predefined field formats, adjusting one or more formats of the organized content information from each of the one or more retrieved content items. For example, once the one or more content references are uniquely identified and the one or more associated content items are retrieved, one or more content fields are used to describe the one or more retrieved content items.

In an embodiment, the one or more content fields comprises at least one of a content identifier, a content title, a content summary, a content owner, a content action, a content actor, a content action date, and a container identifier. Examples of the one or more content fields include, but are not limited to, the content identifier being an ID of content, the content action being an action acted upon the content (e.g. creating, updating, deleting, etc.), the content actor being a user who performed a content action, and the content identifier being an ID of a container. For example, normalizing the one or more retrieved content items includes storing the content information from each of the one or more retrieved content items into common field names (i.e. the one or more content fields). The content information is then normalized based on the predefined field format of the corresponding content field associated with the content information. For example, content information associated with identifiers (such as an actor identifier, content identifier, container identifier, or owner identifier) are normalized (i.e. standardized) to commonly understood identifiers outlined by the predefined field format for the corresponding identifiers. In an example, content information associated with a content action date is normalized to a specific time zone outlined by the predefined field format of the content action date field, e.g. Coordinated Universal Time (UTC). In an example, content information associated with a content action is translated to a commonly understood term (e.g. creating, updating, deleting). In an example, content information associated with a content owner is converted (i.e. normalized) to a first name and a second name associated with the content owner. A similar approach can be taken when normalizing content information associated with a content actor.

Step 340 comprises recreating electronic content by combining the one or more normalized content items.

In an embodiment, combining the one or more normalized content items comprises identifying one or more content events associated with each of the one or more normalized content items, wherein the one or more content events are from the one or more content sources. The method then comprises identifying a timestamp associated with each of the one or more identified content events and, for each of the one or more normalized content items, arranging the one or more identified content events based on the identified timestamp associated with each of the one or more identified content events. The method then comprises determining an information consistency of each of the one or more normalized content items by assessing the one or more arranged content events and selecting one or more content items from the one or more normalized content items based on the determined information consistency of each of the one or more normalized content items. The method then comprises combining the one or more selected content items.

For example, the one or more content events associated with each of the one or more normalized content items (i.e. attached to the one or more content sources) are analyzed chronologically. Each related content event of the one or more content events is selected from each of the one or more content sources. For example, determining an information consistency of each of the one or more normalized content items by assessing the one or more arranged content events comprises verifying that the current understanding of the state of each of the one or more arranged content events associated with the one or more normalized content items is consistent where specified. The current understanding of the state can be with respect to common attributes shared by the one or more arranged content events (i.e. the content information organized using the one or more identified content fields). For example, selecting one or more content items from the one or more normalized content items based on the determined information consistency of each of the one or more normalized content items comprises maintaining the latest (i.e. the most recent with respect to the timestamps) content event of the one or more content events. In an example, two content events are identified, each from a different content source to the other. The timestamp for each of the two content events is identified, and the two content events are arranged chronologically. The information consistency between the two content events is assessed (i.e. information of the first content item of the two content items is assessed against information of the second content item of the two content items, and the information consistency between the two content items is determined). The information consistency can also be determined between two or more normalized content items based on the assessment of their corresponding arranged content events. Once the information consistency between two or more content events has been assessed and determined, the information consistency of the content items associated with the two or more content events can be determined.

In an embodiment, combining the one or more normalized content items further comprises identifying a measure of information richness associated with each of the one or more normalized content items, such that selecting one or more content items from the one or more normalized content items is further based on the identified measure of information richness associated with each of the one or more normalized content items. For example, where an information richness associated with a first content item or a first content event is greater than an information richness associated with a second content item or a second content event, the first content item or first content event is selected. In an example, a first content item/event is older than a second content item/event (i.e. the first content item/event has an associated timestamp that conveys an earlier date than the timestamp associated to the second content item/event). Further, the information richness associated with the first content item/event is greater than the information richness associated with the second content item/event (i.e. the information associated with the first content item/event is richer than the information associated with the second content item/event). Richer information refers to information containing a markup. In this example, the first content/item/event is converted to plain text, then an algorithm (i.e. a standard Longest Common Subsequence algorithm) is used to detect information changes between the first content item/event and the second content item/event. The detected information changes are then applied to the first content item/event (i.e. the first content item/event is amended to include the detected information changes). If the information changes are too large (i.e. too complex), then the plain text of the first content item/event is selected for combining the one or more selected content items/events.

In an example, there are three content events relating to a primary content item from a Wiki page in IBM Connections. A first content event of the three content events is the earliest content event of the three content events. The first content event is an edit event (i.e. a content action) in IBM Connections (i.e. the content source) that provide information relating to a content summary. A second content event of the three content events is a later event compared to the first content event. The second content event is found in a social media application (i.e. the content source) and includes content information relating to OpenGraph™ data. The second content event contains a reference to the content item from the Wiki page in IBM Connections. Any additional content fields associated with the content item and attached to the second content event are recorded. The second content event is verified by determining the information consistency between the second content event and the first content event. A third content event of the three content events is a later event compared to the second content event, and the latest content event of the three content events. The third content event is found in IBM Connections (i.e. the content source) and is associated with a content item including information describing a comment on the Wiki page. As a result, the third content event is associated with a content item that is separate from the primary content item, but is related to the primary content item. The third content event and its associated content item are recorded in case the user wants to recreate the electronic content associated with the third content event as well.

In an example, if a container identifier of a container associated with a content item has been identified, content events associated with the content item and related to navigation events are recorded, so that the location of the content item within the container can be recreated.

By way of further example, let us consider a situation where an image file (i.e. the electronic content) was located in a team collaboration/communication application, including a rich comment stream associated with the image file, and has since been deleted. A link (e.g. a hyperlink) to the image file (i.e. a content reference) had been posted on a social media platform. Consequently, the social media platform had retrieved and stored content information relating to OpenGraph™ data associated with the image file. The content information includes a version of the image file and any title and/or summary information relating to the image file at that point in time (i.e. content items retrieved from the content reference). Further, the last time the file was edited (i.e. the most recent content event relating to a content item of the electronic content), a notification was sent to one or more individuals. The notification (i.e. a content item) contained the most recent information relating to the content event (e.g. summary information). However, the notification may not have contained the actual image of the image file. Additionally, when a comment was added in the comment stream associated with the image file, a notification (i.e. content item) was sent to the owner of the image file and the individuals mentioned within the comment. The notification included the comment content and a brief summary relating to the electronic content (e.g. the title of the image file). According to a proposed embodiment, the information associated with the content reference and content events (i.e. the content items) mentioned above are normalized and then combined to recreate the most recent and richest version of the image file (i.e. the electronic content), along with the comment stream associated with the image file.

As yet another example, let us consider a situation where a research document (i.e. electronic content) was previously located in a particular storage directory of a preprint server accessible to authorized members of a research team, but has since been deleted. A link (e.g. file address) to the document (i.e. a content reference) had been shared amongst the team members via a social media platform (as a social media message/post). Consequently, the social media platform had retrieved and stored content information associated with the document. The content information included a version of the document, its title, abstract and a preview image of each page of the document at that point in time (i.e. content items retrieved from the content reference). Additionally, when a reply was provided to the social media message/post, a notification (i.e. content item) was sent to the author of the social media message/post and the individuals mentioned within the message/post. The notification included the reply content and a brief summary relating to the electronic content (e.g. the title, abstract and preview images of the document). According to a proposed embodiment, the information associated with the content reference and content events (i.e. the content items) mentioned above is normalized. For example, the preview images of the document may be converted to a standard image file format (e.g. JPEG) and/or re-sized. Further, text in the titles, abstracts, and summaries is converted into English, and allocated into title, abstract and summary fields (i.e. content fields). The text is then normalized based on field formats associated with each of the fields (e.g. names of individuals within the titles are convert into a first and second name format). Once the content reference and content events have been normalized, the content reference and content events (i.e. content items) are then combined to recreate the most recent and richest version of the document (i.e. the electronic content), along with the comment stream associated with the document. In the example, combining the content reference and content events (content items) comprises organizing the notifications (i.e. content items) based on when the notifications were sent (i.e. a timestamp associated with each of the notifications). The normalized content information in the notifications is compared and assessed for similarities (i.e. information consistency) between content fields (e.g. the normalized title in each notification), and the most recent version is selected (e.g. the title with the most recent edit). The normalized content information is also assessed based on an information richness associated with the content information (e.g. identifying a version of the summary in a notification that includes additional images/photos associated with the abstract). The content items (content reference and content events) are selected based on the most recent version of the document, the richest version of the document, or a combination of the most recent and the richest version of the document. In the example, the user determines which version of the document they want to recreate, however in other embodiments this process can be completed automatically. The content reference and content events (i.e. content information from the link and notifications) are then combined to recreate the document (i.e. the electronic content).

In an embodiment, combining the one or more normalized content items further comprises determining the information richness associated with each of the one or more normalized content items by assessing the one or more arranged content events.

In an embodiment, recreating the electronic content comprises recreating the electronic content using one of an original source associated with the content and an external source. For example, a user can (optionally) be presented with a list of verification issues encountered when combining the one or more normalized content items. If it is deemed appropriate to proceed, the electronic content is then recreated either in the original source or an external source (i.e. the electronic content is exported). Examples of an original source include, but are not limited to, an IBM Connections folder and a Confluence Wiki. Examples of an external source include, but are not limited to, a file system and a content manager. In both cases, due consideration is given to whether or not a container (and subsequently a container identifier) has been specified (i.e. identified). If a container has been specified, a zip file is created in the corresponding file system and/or navigation related to the recreated electronic content is recreated in its entirety.

Figure 4:
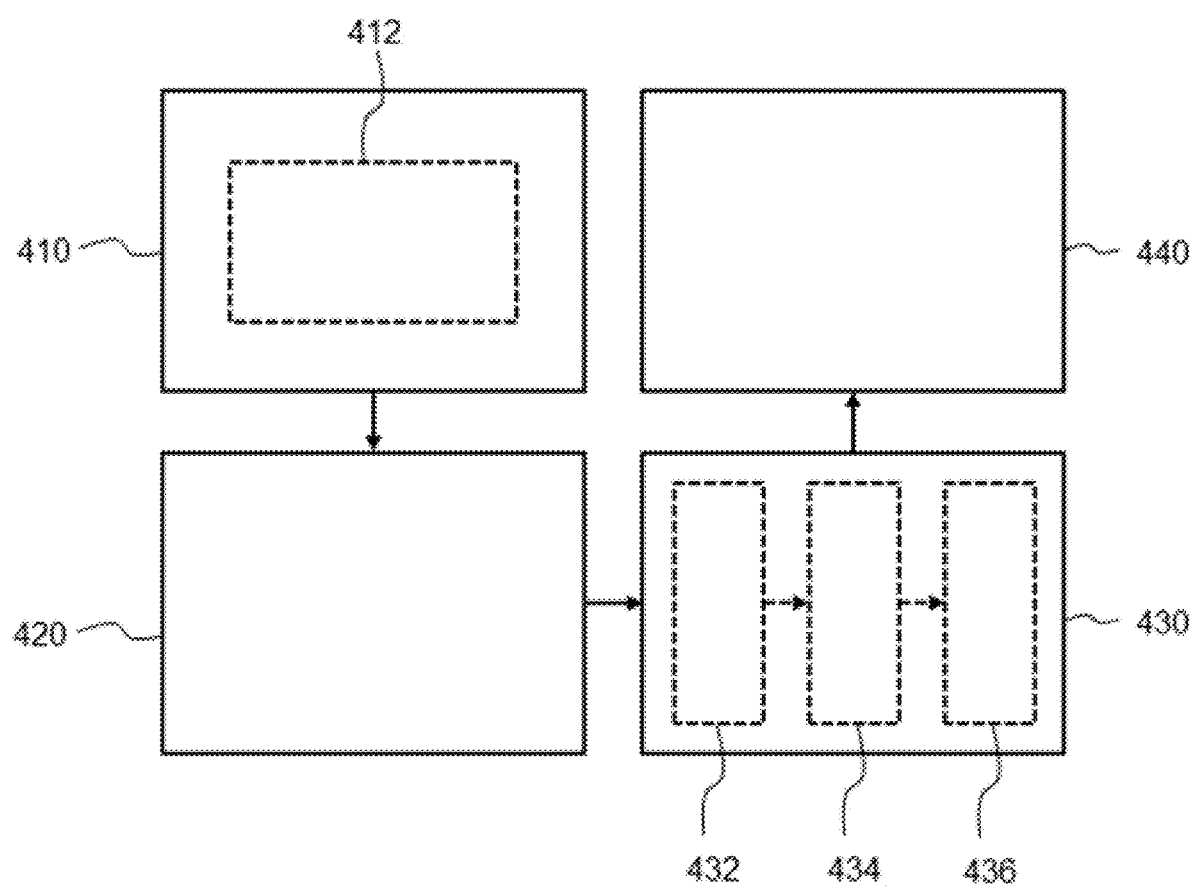
FIG. 4 is a simplified block diagram of an exemplary embodiment of a system for recreating electronic content.

Referring now to FIG. 4, there is depicted a simplified block diagram of an exemplary embodiment of a system for recreating electronic content.

The system comprises a reference-identifying unit 410 configured to identify one or more content references in one or more content sources, wherein each of the one or more content references is associated with a content item. The system further comprises a retrieving unit 420 configured to, for each of the one or more identified content references, retrieve the associated content item. The system further comprises a normalizing unit 430 configured to normalize the one or more retrieved content items to obtain one or more normalized content items and a recreating unit 440 configured to recreate electronic content by combining the one or more normalized content items.

In an embodiment, the reference-identifying unit 410 comprises a property-identifying unit 412 configured to identify one or more reference properties. The reference-identifying unit 410 is further configured to identify the one or more content references based on the one or more identified reference properties.

In an embodiment, the one or more reference properties associated with each of the one or more content references comprises at least one of a content generator, a content identifier, a content network address, and a container identifier.

In an embodiment, the normalizing unit 430 comprises a field-identifying unit 432 configured to identify one or more content fields, wherein each of the one or more content fields comprises a predefined field format. The normalizing unit 430 further comprises an organizing unit 434 configured to organize content information from each of the one or more retrieved content items using the one or more identified content fields and an adjusting unit 436 configured to, based on the one or more predefined field formats, adjust one or more formats of the organized content information from each of the one or more retrieved content items.

In an embodiment, the one or more content fields comprises at least one of a content identifier, a content title, a content summary, a content owner, a content action, a content actor, a content action date, and a container identifier.

In an embodiment, the recreating unit 440 comprises an event-identifying unit configured to identify one or more content events associated with each of the one or more normalized content items, wherein the one or more content events are from the one or more content sources. The recreating unit 440 further comprises a timestamp-identifying unit configured to identify a timestamp associated with each of the one or more identified content events and an arranging unit configured to, for each of the one or more normalized content items, arrange the one or more identified content events based on the identified timestamp associated with each of the one or more identified content events. The recreating unit 440 further comprises a determining unit configured to determine an information consistency of each of the one or more normalized content items by assessing the one or more arranged content events and a selecting unit configured to select one or more content items from the one or more normalized content items based on the determined information consistency of each of the one or more normalized content items. The recreating unit 440 is further configured to recreate electronic content by combining the one or more selected content items.

In an embodiment, the recreating unit 440 further comprises a richness-identifying unit configured to identify a measure of information richness associated with each of the one or more normalized content items, such that the selecting unit is further configured to select one or more content items from the one or more normalized content items based on the identified measure of information richness associated with each of the one or more normalized content items.

In an embodiment, the recreating unit 440 further comprises a richness-determining unit configured to determine the information richness associated with each of the one or more normalized content items by assessing the one or more arranged content events.

Figure 5:
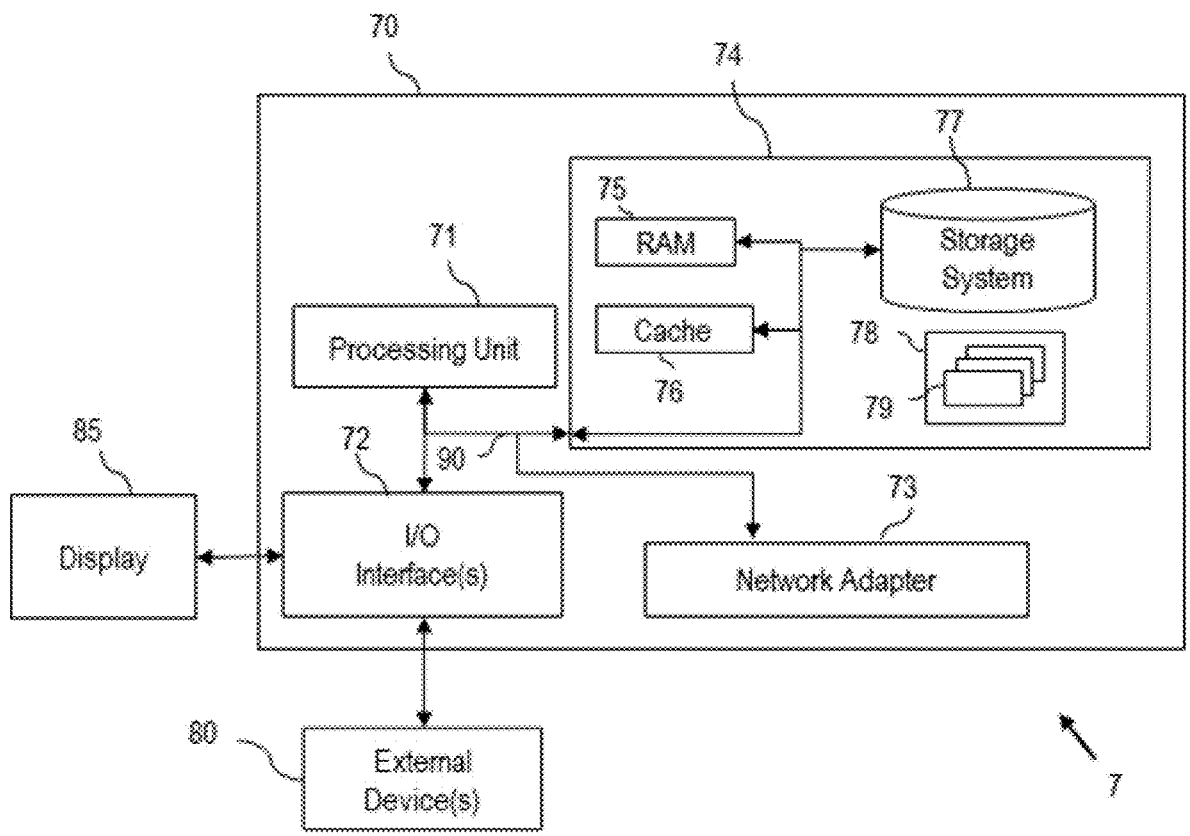
FIG. 5 is a simplified block diagram of an exemplary embodiment of a system for recreating electronic content.

By way of further example, as illustrated in FIG. 5, embodiments may comprise a computer system 70, which may form part of a networked system 7. For instance, a retrieving unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for determining intent of a query provided to a QA system according to a proposed embodiment.

Program/utility 78, having a set (at least one) of program modules 79, may be stored in memory 74. Program modules 79 generally carry out the functions and/or methodologies of proposed embodiments determining intent of a query provided to a QA system.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recreating electronic content, the method comprising:
   identifying, in one or more content sources, one or more content references of electronic content, wherein each of the one or more content references is associated with a content item related to the electronic content, and wherein the electronic content was previously deleted;
   for each of the one or more identified content references, retrieving the associated content item;
   normalizing the one or more retrieved content items to obtain one or more normalized content items, including adjusting a format of the content items; and
   recreating the previously deleted electronic content by combining the one or more normalized content items, including restoring the recreated electronic content to a computing system, wherein combining the one or more normalized content items includes:
   identifying, from the one or more content sources, one or more content events associated with each of the one or more normalized content items;
   arranging, for each of the one or more normalized content items, the one or more identified content events based on an identified timestamp associated with each of the one or more identified content events;
   selecting one or more content items from the one or more normalized content items based on an information consistency of each of the one or more normalized content items determined based on the one or more arranged content events; and
   combining the one or more selected content items.

2. The method of claim 1, wherein identifying the one or more content references in the one or more content sources comprises:
   identifying one or more reference properties; and
   identifying the one or more content references based on the one or more identified reference properties.

3. The method of claim 2, wherein the one or more reference properties associated with each of the one or more content references comprises at least one of: a content generator; a content identifier; a content network address; and a container identifier.

4. The method of claim 1, wherein normalizing the one or more retrieved content items comprises:
   identifying one or more content fields, wherein each of the one or more content fields comprises a predefined field format;
   organizing content information from each of the one or more retrieved content items using the one or more identified content fields; and
   based on the one or more predefined field formats, adjusting one or more formats of the organized content information from each of the one or more retrieved content items.

5. The method of claim 4, wherein the one or more content fields comprises at least one of: a content identifier; content title; a content summary; a content owner; a content action; a content actor; a content action date; and a container identifier.

6. The method of claim 1, further comprising identifying a measure of an amount of detail included within each of the one or more normalized content items, such that selecting one or more content items from the one or more normalized content items is further based on the identified measure of the amount of detail included within each of the one or more normalized content items.

7. The method of claim 6, further comprising determining the amount of detail included within each of the one or more normalized content items by assessing the one or more arranged content events, and wherein at least one of the one or more content sources is a notification system.

8. The method of claim 1, wherein recreating the electronic content comprises recreating the electronic content using one of: an original source associated with the content; and an external source.

9. A computer program product for recreating electronic content, the computer program product comprising a non-transitory computer readable storage medium having program instructions embodied therewith, the program instructions executable by a processing unit to cause the processing unit to perform a method comprising:
- identifying, in one or more content sources, one or more content references of electronic content, wherein each of the one or more content references is associated with a content item related to the electronic content, and wherein the electronic content was previously deleted;
- for each of the one or more identified content references, retrieving the associated content item;
- normalizing the one or more retrieved content items to obtain one or more normalized content items, including adjusting a format of the content items; and
- recreating the previously deleted electronic content by combining the one or more normalized content items, including restoring the recreated electronic content to a computing system, wherein combining the one or more normalized content items includes:
  - identifying, from the one or more content sources, one or more content events associated with each of the one or more normalized content items;
  - arranging, for each of the one or more normalized content items, the one or more identified content events based on an identified timestamp associated with each of the one or more identified content events;
  - selecting one or more content items from the one or more normalized content items based on an information consistency of each of the one or more normalized content items determined based on the one or more arranged content events; and
  - combining the one or more selected content items.

10. A system for recreating content, the system comprising a computing device, a computer processor, and a computer memory operatively coupled to the computer processor, the computer memory comprising a reference identifying unit, a retrieving unit, a normalizing unit, a recreating unit, and computer program instructions that are configured to, when executed by the computer processor, cause the system to perform operations comprising:
- identifying, by the reference identifying unit and within one or more content sources, one or more content references of electronic content, wherein each of the one or more content references is associated with a content item related to the electronic content, and wherein the electronic content was previously deleted;
- retrieving, by the retrieving unit for each of the one or more identified content references, the associated content item;
- normalizing, by the normalizing unit, the one or more retrieved content items to obtain one or more normalized content items, including adjusting a format of the content items; and
- recreating, by the recreating unit, the previously deleted electronic content by combining the one or more normalized content items, including restoring the recreated electronic content to the system, wherein combining the one or more normalized content items includes:
  - identifying, from the one or more content sources, one or more content events associated with each of the one or more normalized content items;
  - arranging, for each of the one or more normalized content items, the one or more identified content events based on an identified timestamp associated with each of the one or more identified content events;
  - selecting one or more content items from the one or more normalized content items based on an information consistency of each of the one or more normalized content items determined based on the one or more arranged content events; and
  - combining the one or more selected content items.

11. The system of claim 10, wherein:
the reference-identifying unit comprises a property-identifying unit configured to identify one or more reference properties; and
the reference-identifying unit is further configured to identify the one or more content references based on the one or more identified reference properties.

12. The system of claim 11, wherein the one or more reference properties associated with each of the one or more content references comprises at least one of: a content generator; a content identifier; a content network address; and a container identifier.

13. The system of claim 10, wherein the normalizing unit comprises:
- a field-identifying unit configured to identify one or more content fields, wherein each of the one or more content fields comprises a predefined field format;
- an organizing unit configured to organize content information from each of the one or more retrieved content items using the one or more identified content fields; and
- an adjusting unit configured to, based on the one or more predefined field formats, adjust one or more formats of the organized content information from each of the one or more retrieved content items.

14. The system of claim 13, wherein the one or more content fields comprises at least one of: a content identifier; a content title; a content summary; a content owner; a content action; a content actor; a content action date; and a container identifier.

15. The system of claim 10, wherein the recreating unit further comprises a richness-identifying unit configured to identify a measure of an amount of detail included within each of the one or more normalized content items, such that the selecting unit is further configured to select one or more content items from the one or more normalized content items based on the identified measure of the amount of detail included within each of the one or more normalized content items.

16. The system of claim 15, wherein the recreating unit further comprises a richness-determining unit configured to determine the amount of detail included within each of the one or more normalized content items by assessing the one or more arranged content events, and wherein at least one of the one or more content sources is a notification system, and wherein at least one of the one or more retrieved content items is a notification within the notification system.

17. The system of claim 10, wherein the recreating unit is further configured to recreate the electronic content using one of: an original source associated with the content; and an external source.

\* \* \* \* \*